United States Patent
Turk et al.

[11] Patent Number: 5,983,207
[45] Date of Patent: Nov. 9, 1999

[54] ELECTRONIC CASH ELIMINATING PAYMENT RISK

[76] Inventors: James J. Turk; Geoffrey Turk, both of P.O. Box 4682, Greenwich, Conn. 06830

[21] Appl. No.: 08/921,760

[22] Filed: Aug. 26, 1997

Related U.S. Application Data

[63] Continuation-in-part of application No. 08/465,430, Jun. 5, 1995, Pat. No. 5,671,364, which is a continuation-in-part of application No. 08/015,588, Feb. 10, 1993, abandoned.

[51] Int. Cl.$^6$ ................................................. G06F 153/00
[52] U.S. Cl. ........................... 705/39; 705/22; 705/26; 705/41; 705/43
[58] Field of Search ................... 705/39, 22, 26, 705/41, 43; 380/4, 30, 25, 24; 340/825.31, 825.34

[56] References Cited

U.S. PATENT DOCUMENTS

| | | | |
|---|---|---|---|
| 4,503,503 | 3/1985 | Suzuki | 705/400 |
| 4,529,870 | 7/1985 | Chaum | 235/380 |
| 4,759,063 | 7/1988 | Chaum | 380/30 |
| 4,759,064 | 7/1988 | Chaum | 380/30 |
| 4,851,999 | 7/1989 | Moriyama | 705/30 |
| 4,914,698 | 4/1990 | Chaum | 380/30 |
| 4,926,480 | 5/1990 | Chaum | 380/23 |
| 4,947,430 | 8/1990 | Chaum | 380/25 |
| 4,949,380 | 8/1990 | Chaum | 380/30 |
| 4,977,595 | 12/1990 | Ohta et al. | 380/24 |
| 5,010,485 | 4/1991 | Bigari | 364/408 |
| 5,131,039 | 7/1992 | Chaum | 380/23 |
| 5,224,162 | 6/1993 | Okamoto et al. | 380/24 |
| 5,276,736 | 1/1994 | Chaum | 380/24 |
| 5,303,383 | 4/1994 | Neches et al. | 395/500 |
| 5,453,601 | 9/1995 | Rosen | 235/379 |
| 5,455,407 | 10/1995 | Rosen | 235/380 |
| 5,493,614 | 2/1996 | Chaum | 380/30 |
| 5,511,121 | 4/1996 | Yakobi | 380/24 |
| 5,521,980 | 5/1996 | Brands | 380/30 |
| 5,539,825 | 7/1996 | Akiyama et al. | 380/24 |
| 5,666,493 | 9/1997 | Wojcik et al. | 705/26 |
| 5,812,668 | 9/1998 | Weber | 380/24 |
| 5,832,089 | 11/1998 | Kravitz et al. | 380/24 |
| 5,850,446 | 11/1998 | Burger et al. | 380/24 |

OTHER PUBLICATIONS

DigiCash—Company Brochure "DigiCash—Numbers That Are Money" Jun. 11, 1997; 4 pages.

*Primary Examiner*—Allen R. MacDonald
*Assistant Examiner*—Romain Jeanty

[57] ABSTRACT

A system and method to allow gold to circulate as digital cash through the global computer network (Internet) and/or private communication networks much like cash currently circulates in the physical world. A computer system (emint) will create digital representations of gold (ecoins). Each ecoin will represent a weight of gold held at a participating secure storage facility (storage site), and each ecoin is given by the emint a unique Digital Hallmark™ by which it can be distinguished and identified. The sum total of all circulating ecoins (denominated in physical measures such as weights such as grams and/or ounces and fractions thereof) will equal the weight of all the gold held for safekeeping at the storage site(s) for the users of the emint. The ownership of gold is not transferred by a computer system executing debits and credits between individual accounts, but instead by individuals directly transferring ecoins amongst themselves (as is done in cash transactions, i.e., without double-entry bookkeeping).

11 Claims, 1 Drawing Sheet

ELECTRONIC CASH ELIMINATING PAYMENT RISK

This is a continuation in part of my application Ser. No. 08/465,430, filed Jun. 5, 1995 now Pat. No. 5,671,364; which is a continuation in part of application Ser. No. 08/015,588, filed Feb. 10, 1993, now abandoned.

FIELD OF THE INVENTION

This invention relates to electronic transaction systems, and more specifically to a system using an asset-based electronic cash system, using public key digital signature systems, for settlement of payment obligations.

BACKGROUND OF THE INVENTION

Recent advances in the field of cryptography have made possible the secure and privacy-protected transfer of digital information over insecure, open communication channels such as the global computer network known as the "Internet", by using public key encryption technologies.

Public key encryption methods have been developed for use in electronic cash. In one such method known as the RSA algorithm, encryption and decryption are accomplished by two mathematical equations which are related as inverses of each other. These equations are the private key, used by the issuing financial institution to digitally sign, or certify, a note, and the related public key, used by the recipient to determine and verify the existence of a valid signature on the note. Such protocols are known in the art and are described for example in Chaum, U.S. Pat. No. 4,759,063, the disclosure of which is hereby incorporated by reference.

In addition to such digital signature methods for certifying a digital note, a blind signature protocol has been developed so that the certifying financial institution cannot determine the note which it has certified, allowing the user to maintain his privacy. In such systems the user "blinds" the note he submits to the financial institution for its digital signature, the financial institution applies its digital signature to certify the note, and the user then unblinds the note and uses it to make a payment to a payee. A blind signature system is described in Chaum, U.S. Pat. No. 4,759,063 which has been incorporated by reference, and is in commercial use by DigiCash b.v. of the Netherlands.

In order to prevent a user from spending the note more than once, methods have been developed for testing the note to determine if it has already been spent. In one such system, if a note is spent twice, the identity of the user is revealed. Such a system is more suitable for lower value payments and is disclosed for example in Chaum, U.S. Pat. No. 4,914,698. For higher value payments, the payee will verify the status of the received note with the issuing financial institution, which will keep a database of issued and spent notes.

In still other methods, notes may be generated that can have plural currency values (like a wallet containing $10, $5, and $1 bills) or which can have a variable value as portions of the note are spent. Such methods are disclosed in Chaum, U.S. Pat. No. 4,949,380, which is hereby incorporated by reference.

In summary, such public key signature systems allow an issuing financial institution to digitally sign an electronic note with its secret key such that the user, and the ultimate payee, can verify the authenticity of the note and the ability to make payment. The blinding protocol protects the user's privacy by preventing the financial institution from tracing a note subsequently presented to it for payment as cash.

In such systems, the electronic note signed by the issuing financial institution is denominated in a national currency. In my prior copending application Ser. No. 08/465,430, which is hereby incorporated by reference, I have described the problems associated with payment systems based on national currencies and the problems associated with common banking practices.

A particular problem is the payment risk now inherent in existing payment mechanisms, and the problem of "float." Payment risk arises in conventional banking systems where a financial institution accepts deposits, then in turn loans out that money to others. This is known as "fractional banking," in that the financial institution only keeps on hand a fraction of the actual assets it is holding for the account of its depositors. If the financial institution fails due to bad loans or fraud, the financial institution lacks sufficient assets to pay off its depositors. This practice has lead to significant losses in connection with financial institution failures such as at the Herstatt Bank in Germany and the BCCI scandal. A related payment risk arises due to the fluctuating value of national currencies due to inflation and currency exchange rate variations dependent on the economy of the nation issuing the currency. Thus, there is a risk incurred by accepting national currencies.

"Float" is the amount of time a payee must wait for a transaction to be processed. This is considered an expense because of the unavailability of finds, which represents opportunity costs. In order to eliminate these payment risks and float, my invention disclosed in my copending parent application uses an asset (like gold) instead of a liability (national currency) for settling payments in a book-entry accounting system.

However, situations exist in which using a book-entry system for payments may be inexpedient or disadvantageous. In many cases, the payer and/or payee in a transaction may not want to be identified with a specific payment, preferring instead to remain anonymous. Currently, paper cash and metal coins provide such privacy in a transaction. Electronic cash also provides such privacy, although the payee can make himself known to the issuing financial institution as the recipient of anonymous funds when he redeems an electronic note for cash or other payment.

Also, smaller payments (generally considered to be amounts of less than U.S. $10) may be uneconomical to process through a book-entry system, because double-entry bookkeeping generally involves relating particular credits and debits to particular accounts, i.e., correctly identifying the payer and the payee with each transaction and the amounts involved. The cost of knowing the identities of customers is high if it requires human operators to verify this information.

Accordingly, it would be desirable to provide a system that provides anonymity to one or more parties in a payment transaction, and provides the advantages of elimination of payment risk as described and claimed in my prior parent application.

OBJECTS OF THE INVENTION

Accordingly, it is an object of the present invention to increase efficiency and surety of electronic cash payments by introducing a digital transaction system whose unit of account is an asset, as opposed to all other current electronic cash whose units of account are liabilities, thereby eliminating problems of payment risk inherent in current banking and electronic cash systems.

Another object is to increase security and privacy of said asset-based digital transaction system by using public key encryption with digital signature methods preferably coupled with blind signature methods.

Other objects, aspects and features of the present invention in addition to those mentioned above will be pointed out in or will be understood from the following detailed description provided in conjunction with the accompanying drawings.

DETAILED DESCRIPTION OF THE INVENTION

Figure 1:
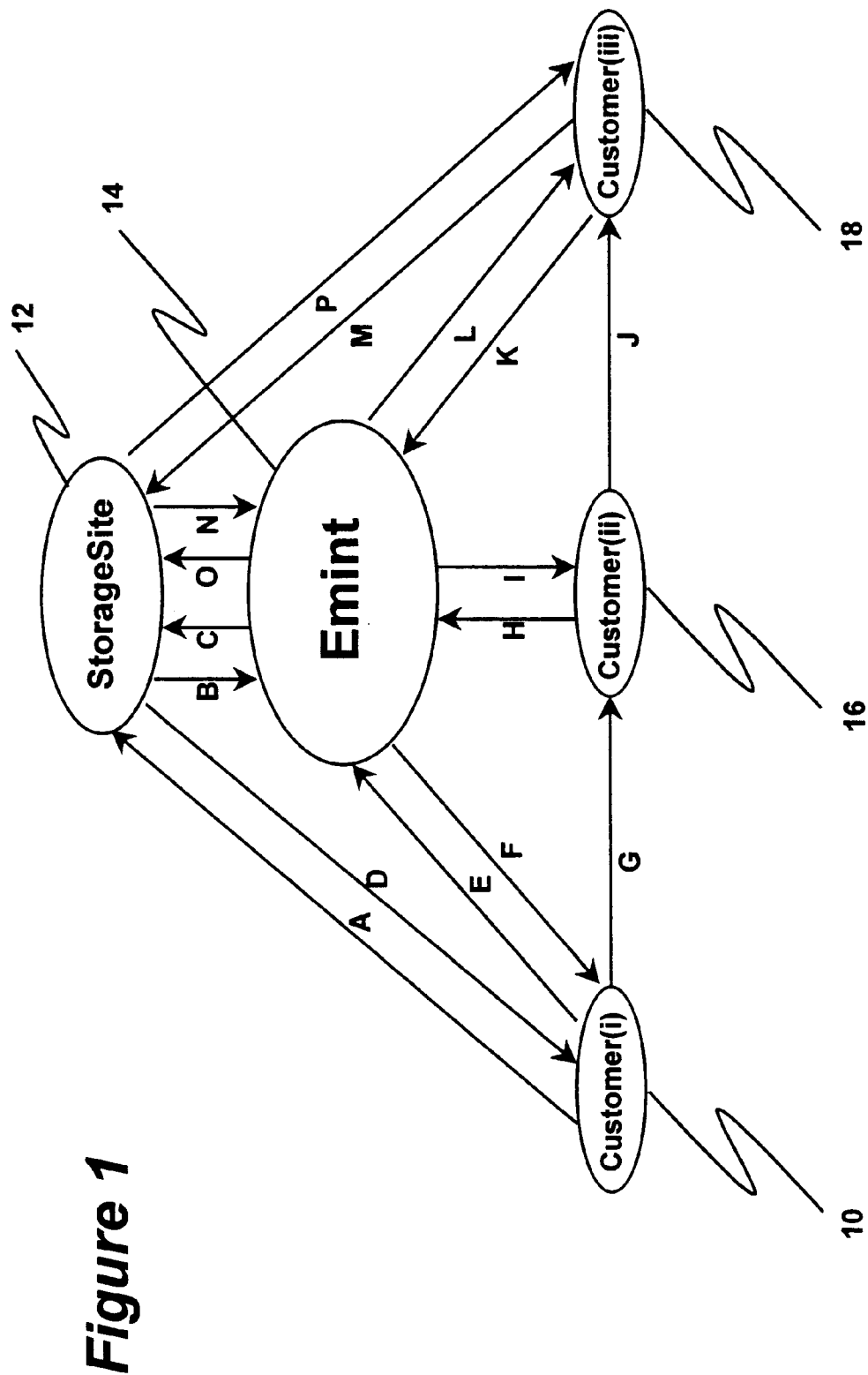
FIG. 1 shows a flowchart illustrating the operation of an asset-based electronic cash system in accordance with the invention.

A glossary of the terms used in the present application is provided hereafter.

As used herein, a "book-entry system"—also called "double-entry bookkeeping," is a bookkeeping method of accounting in which a debit in one individual's account is also entered as an equivalent credit in another individual's account, and vice versa. All banks currently use this method of accounting when handling currency payments with other banks as well as between customers within the same financial institution.

As used herein, "client software" is a software application which runs on an individual's computer, allowing him to verify and exchange ecoins with the emint, to send and receive ecoins from other individuals, and to manage his ecoins stored in the memory of his computer.

As used herein, "Digital Hallmark™" is a digital signature or any other protocol for cryptographic authentication attached to each ecoin by the emint that certifies the genuineness of information embedded in the ecoin.

As used herein, "digital signature" is information generated by a private key applied and appended to electronic data. If the electronic data is not altered after the digital signature has been applied, the signature will verify the authenticity of the electronic data when checked with the corresponding public key.

As used herein, "ecoin" is the electronic representation of a valuable commodity, preferably, a precious metal such as gold, platinum, palladium, or silver, which is held for safekeeping at a storage site. Each ecoin comprises a unique serial number, a measure of the valuable commodity (for example, grams or ounces, and fractions thereof) that it represents, the name of a specific storage site where the valuable commodity is stored, and a date/time stamp of when the ecoin was created. Each ecoin may appear as a string of alphanumeric characters which may also be encrypted and/or digitally signed for security.

As used herein, "encrypt" is to scramble data so as to prevent unauthorized reading.

As used herein, "public key" is a mathematical key which is available publicly and which is used to verify digital signatures created with the matching private key, and in the context of encrypted communications is used to decrypt electronic data which can only be encrypted using the matched private key.

As used herein, "public key cryptography" is a technique for encrypting data by which the key used to decrypt the message is different from the key used to encrypt the message. The digital signature defined above is an application of public key cryptography in that the key used to verify the signature is different from the key used to sign the signature.

As used herein, "private key" is a mathematical key which is kept private to the owner and which is used to create digital signatures, and in the context of encrypted communications, is used to decrypt electronic data encrypted with the corresponding public key.

As used herein, "storage site" is a secure facility (e.g., a vault) in which the valuable commodity (e.g., gold) is held for safekeeping. Preferably there are several storage sites for storing the commodity. The storage sites are preferably located in countries having secure and stable political systems where there is minimal risk of misappropriation of the asset by the government or private persons. The storage sites will typically be a precious metal repository; however, other secure vault facilities could also serve as the storage site. Typical site locations would be London, New York, Zurich and Tokyo, as well as other locations.

The storage site provides facilities for safe and secure storage of the commodity to be used as the asset basis for the electronic cash. Typically such storage site consists of a protected vault. The precious metal repository or protected vault that is servicing the system users will have the ability to (1) receive the commodity from a client, (2) return the commodity to a client, (3) test the purity of the commodity, (4) measure the weight and/or other physical properties of the commodity, (5) provide identifying information for each parcel of the commodity placed within the storage site in order to distinguish between the different parcels belonging to the different clients of the storage site, (6) report to the emint and/or client the quantity of the commodity stored by the client at the storage site, and (7) provide identifying information and the capability to physically separate from the total quantity of the commodity stored in the storage site those parcels of the commodity to be designated for use as currency.

The valuable commodity stored at each storage site must be non-perishable, and most preferably has a high ratio of value to weight and volume. In a preferred embodiment, the commodity comprises a precious metal, such as platinum, palladium, or silver, or most preferably, gold of a specified purity. In the following discussion, gold is given as the example usage, but it is to be appreciated that other precious metals, tangible assets, and valuable commodities could also be used.

The "emint" is a computer and communications system which creates, distributes and verifies the authenticity of ecoins, and which receives information from the storage sites regarding gold held there for storage and specifically identified for use in the digital cash system.

The system of the invention requires some system users to establish a fiduciary relationship with a storage site. The relationship is confirmed when a system user either (1) stores gold with, or (2) purchases from another person gold already held at one or more storage sites. In the first case, the storage site verifies the receipt of the gold and provides confirmation to the system user specifying the pure weight and/or other physical attributes of the gold. In the second case, the storage site records the transfer of gold from one system user to the other.

Then the system user informs the storage site that he wishes to allocate some or all of his gold for use in the digital cash system. The storage site separates this specific weight of gold to be used as currency in a separate area of the vault, designated solely for storing gold in use as electronic cash issued by the emint. The storage site then notifies the emint by data transmission of the exact weight of gold to be created as ecoins.

The emint electronically creates ecoins in a variety of weights. Each ecoin includes information embedded in it comprising: a unique serial number, the weight (denominated in either grams or ounces or other physical measurement) of the gold that it represents, the name of the storage site where the gold is stored, and the date that the ecoin was created. The emint maintains a database of each ecoin it issues, identified by serial number. When anonymity to the users of the system is not assured, the database of the emint may also include the information embedded in the ecoin, such as the weight, identification of the storage site, and the date and time of issue.

Using public key cryptography the emint digitally signs each ecoin with its private key, thus providing each ecoin with a Digital Hallmark™. Blinding techniques may also be used to ensure the privacy of the user (the payer) of the ecoin. The Digital Hallmark™ allows an individual running the emint's client software to verify that an ecoin was in fact issued by the emint and is not a forgery.

Although the Digital Hallmark™ prevents an individual from creating fraudulent ecoins, it does not prevent him from duplicating real ecoins (which can be simply a string of text, and thus easily replicated) in an attempt to spend them twice. For instance, the emint may issue an ecoin to someone who then makes five copies and sends them to five different people.

To prevent multiple spending of the same ecoin, the emint maintains a database of serial numbers of every circulating ecoin so that a payee can contact the emint and confirm the value of each ecoin received (i.e., to make sure the serial number in the database is not recorded as already spent). Confirmation of value may be made nearly instantaneously.

A payee, who has confirmed the value of the ecoin, may then tender it to the emint. Upon tender, the emint will record the serial number of the tendered ecoin as a "spent" ecoin, so that it may not be subsequently reused by the user. The payee can request that the emint treat the tendered ecoin in different ways. The emint could be requested to credit the tendered ecoin to the payee's gold safekeeping account with the storage site; or the payee could request that the units of gold represented by the ecoin be converted to a national currency such as U.S. Dollars and that the U.S. Dollars be transferred by check, wire or other methods to another account; or the payee could request the issuance of a new ecoin to be delivered to the payee for use by the payee in other transactions.

It is to be appreciated that the emint will be responsible for collecting storage fees associated with the stored gold in the digital cash system held for the benefit of the system users. Usually such fees may be periodically charged against the amount of gold in a user's safekeeping account at the storage site. However, when an ecoin has been issued, the gold on account for a system user is treated as withdrawn from the user's safekeeping account in exchange for the ecoin. The emint will desirably recover the storage costs associated with the stored gold that has been converted to ecoins in some way. It is to be appreciated that it would not be feasible to simply charge the user to whom the ecoins were issued during the length of time between issuance and tendering of the ecoin, as this would permit an identification of the link between the user and the payee, since to charge the user for the storage costs that might be associated with an ecoin presented by a payee, the user-payor must necessarily be identified. This approach would compromise the desired privacy of the payment transaction.

One method to recover storage costs would be to simply charge a transaction charge associated with the issuance of the ecoin, such that over time, and on an average basis the emint is able to recover the storage costs. A more sophisticated method would be to collect the storage costs from the tendered ecoin. Obviously, the payee may not wish to be responsible for the prior incurred storage costs of the user, and thus, as part of the confirmation process, the amount of the storage fee cost would need to be reported. This cost would be determined simply from the information embedded in the electronic coin, specifically, based on the date/time stamp showing the moment of issuance of the electronic coin, and the weight of gold involved.

The client software could be designed to calculate the storage fees associated with an ecoin upon its receipt. Alternatively, as part of the value confirmation process, a report to the payee could include both whether or not the ecoin was valid, and its net value after the storage costs are deducted, and any other costs that might appropriately be charged by the emint, as for example, a processing charge for the confirmation or for handling the tender of the ecoin. Thus, for example, if a payee receives several ecoins with a value of 1.237 grams of gold, this weight of gold may be reduced, for example, to 1.235 grams, upon confirmation at the emint because of the storage fee they have accumulated while being held by the payer.

The client software can be set up by a payee to define what is an acceptable net value of ecoins received from the user (payer). If the storage fee is sufficiently high such that the net value of the ecoins is less than the acceptable net value, the ecoins are returned by the payee to the payer with notification of their rejection by the payee. The payer may then choose to forgo the transaction, or he must provide the payee with additional or substitute ecoins.

In another embodiment, the client software can be set up by a payee to define what is an acceptable storage cost to accept, and if the storage fee exceeds the predefined amount, the same process of rejection will occur.

In one embodiment of the invention, the value confirmation and tendering steps are not permissible as separate transactions, but instead are always performed concurrently. In such case, the default mode of operation will have the emint issue new ecoins and transmit them to the party requesting confirmation of ecoins, less the appropriate fees, whenever an ecoin is submitted for confirmation.

The anonymity and privacy of the payee is particularly protected where the payee simply requests issuance of a new ecoin (instead of a deposit to an existing account or conversion to national currency). In this case, the emint's process includes the following steps: (1) the emint records the serial numbers of the received ecoins to designate them as spent, (2) computes a confirmation fee and, if appropriate, a storage fee, (3) creates new ecoins (with different serial numbers) that represent the value of the old ecoins less the confirmation fee and any storage fee, and (4) then electronically sends the new ecoins to the payee. This payee can then make further payment transactions in the same way as the original user. It is noted that in this type of transaction, in order to preserve the anonymity of the payee, the emint may choose not to take note of the identity of who is being issued the new ecoins. The emint operates solely as a database for outstanding and spent ecoins. Its only functions are to confirm ecoins at a payee's request, issue new ecoins, and collect the appropriate confirmation and storage fees. The emint may also incorporate blind signatures into its Digital Hallmark™ to further advance user privacy.

An example of an asset based electronic cash system in accordance with the invention is shown in FIG. 1. Customer (i) 10 stores gold at a storage site 12 and requests the storage site to send him ecoins (arrow A). The storage site contacts the emint 14 and informs it of the receipt of new gold (arrow B).

The emint creates ecoins (not shown) whose total sum represents the exact weight of new gold and transfers the newly created ecoins to the storage site, each ecoin containing a Digital Hallmark™ used for verification purposes (arrow C). After obtaining the client software, which is necessary in order to receive ecoins from others and to confirm with the emint the value of each ecoin received, Customer(i) contacts the storage site to receive the ecoins and the ecoins are transferred to him (arrow D). The customer may then verify the Digital Hallmark™ applied thereto using the emint's public key. Customer(i) can also send the ecoins to the emint for confirmation (arrow E). The emint then confirms the value of the ecoins. As noted above, the emint may be set up so that upon a request for confirmation, the emint automatically retires the ecoins, deducts the confirmation and storage fees, then creates and sends back new ecoins to Customer(i) (arrow F).

Alternatively, the emint could transmit the ecoins directly to Customer (i), who can verify the Digital Hallmark™ applied thereto using the emint's public key.

Once Customer(i) receives the ecoins, he can transfer the ecoins while online to Customer(ii) 16, who also has the client software, for the payment of goods or services (arrow G). Customer(ii) then can send the ecoins to the emint for confirmation (arrow H). The emint then confirms and retires the coins, deducts storage and confirmation fees, then creates and sends new ecoins back to Customer(ii) (arrow I). Customer(ii) need not have an account relationship with the storage site. Customer(ii) can then send the ecoins to Customer(iii) 18, who also has the client software, for the payment of goods or services (arrow J).

Customer(iii) can then send the ecoins to the emint for confirmation (arrow K). The emint confirms and retires the ecoins, deducts storage and confirmation fees, then creates and sends new ecoins back to Customer(iii)(arrow L).

Ecoins are taken out of circulation when a party, such as Customer(iii), sends ecoins to the storage site and requests redemption of them into gold bullion (arrow M). The storage site sends the ecoins to the emint for confirmation, along with a message saying that the gold is being redeemed (arrow N). The emint verifies the ecoins, deducts the appropriate storage and confirmation fees, and sends a message back to the storage site stating the exact weight of gold left over (i.e., the weight of gold originally represented by the ecoins less the storage/confirmation fees) for redemption (arrow O). The storage site then ships the specified weight of gold bullion to the individual who requested it (arrow P), or enters a credit for an amount of gold held for safekeeping for Customer (iii) at the storage site, or takes such other actions as instructed.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. An asset based electronic cash system comprising:

at least one storage site having secure facilities for storage of a valuable commodity;

an inventory of a valuable commodity stored in said secure facilities at a said storage site;

a computer system having:

means for maintaining records of the amount of said inventory of a valuable commodity stored in said secure facility;

means for creating electronic coins, said electronic coins comprising electronic data identifying a unique serial number and a specified amount of said valuable commodity, and having a digital signature for verifying that the electronic coins were created by said computer system;

means for transmitting said electronic coins to a system user;

means for receiving said electronic coins from a payee of said system user;

means for confirming that said electronic coins have not been previously spent;

the total of the amounts of said electronic coins issued by said computer system being less than or equal to the amount of said inventory of a valuable commodity stored in said secure facility;

said asset based electronic cash system permitting entities to conduct financial transactions by transfer of said electronic coins, whereby payment risk is eliminated.

2. A system in accordance with claim 1 where said valuable commodity comprises a precious metal.

3. A system in accordance with claim 2 wherein said precious metal comprises gold.

4. A system in accordance with claims 1 wherein said electronic data of said electronic coins further comprise:

a name of said storage site where said valuable commodity is stored;

a date, wherein said date represents the date when said electronic coin was created.

5. A system in accordance with claim 4 wherein said system user may request issuance of blinded electronic coins such that a user who receives said electronic coins maintains his anonymity.

6. A system in accordance with claims 1, 2, 3, 4 or 5 wherein said confirming means comprises a database of said serial numbers of said electronic coins wherein a recipient of a first electronic coin may submit said first electronic coin to said computer system to determine if said first electronic coin has been previously spent.

7. A system in accordance with claim 6 wherein said computer system checks said database of said serial numbers to ensure that said first electronic coin has not been previously spent, and if said first electronic coin has not been previously spent then said computer system records said first electronic coin as spent, and creates a second electronic coin and transmits said second electronic coin to said recipient.

8. A system in accordance with claim 7 wherein said computer system subtracts an amount representing transactional costs from a specified amount of said valuable commodity identified in said first electronic coin to determine a specified amount of said valuable commodity identified in said second electronic coin.

9. A system in accordance with claim 8 wherein said transactional costs include a storage fee, and wherein said storage fee is determined based on a period of time since the date when said electronic coin was created, said date when said electronic coin was created being contained in said electronic data contained in said electronic coin.

10. A system in accordance with claim 8 wherein said transactional costs include a fee for performing said confirming that said electronic coin has not been previously spent.

11. A system in accordance with claim 6 wherein said recipient of a first electronic coin may request that said electronic coin be redeemed for one or more of the group consisting of a second electronic coin; a credit to an account of the recipient; and issuance of a funds transfer to an account of a third party.

* * * * *

(12) EX PARTE REEXAMINATION CERTIFICATE (6601st)

United States Patent
Turk et al.

(10) Number: US 5,983,207 C1
(45) Certificate Issued: Jan. 6, 2009

(54) ELECTRONIC CASH ELIMINATING PAYMENT RISK

(75) Inventors: James J. Turk, Greenwich, CT (US); Geoffrey Turk, Greenwich, CT (US)

(73) Assignee: GM Network Limited, Douglas (IM)

Reexamination Request:
No. 90/006,352, Aug. 9, 2002

Reexamination Certificate for:
Patent No.: 5,983,207
Issued: Nov. 9, 1999
Appl. No.: 08/921,760
Filed: Aug. 26, 1997

Related U.S. Application Data

(63) Continuation-in-part of application No. 08/465,430, filed on Jun. 5, 1995, now Pat. No. 5,671,364, which is a continuation-in-part of application No. 08/015,588, filed on Feb. 10, 1993, now abandoned.

(51) Int. Cl.
*G06Q 40/00* (2006.01)

(52) U.S. Cl. .............. 705/39; 705/22; 705/26; 705/41; 705/43

(58) Field of Classification Search .............. 705/39–42, 705/22, 26
See application file for complete search history.

(56) References Cited

U.S. PATENT DOCUMENTS

| | | | |
|---|---|---|---|
| 3,573,747 A | 4/1971 | Adams et al. | |
| 4,023,013 A | 5/1977 | Kinker | |
| 4,312,510 A | 1/1982 | Bodner | |
| 4,314,352 A | 2/1982 | Fought | |
| 4,538,816 A | 9/1985 | Figueroa | |
| 4,677,552 A | 6/1987 | Sibley, Jr. | |
| 4,694,397 A | 9/1987 | Grant et al. | |
| 4,891,503 A | 1/1990 | Jewell | |
| 4,903,201 A | 2/1990 | Wagner | |
| 4,931,932 A | 6/1990 | Dalnekoff et al. | |
| 4,933,842 A | 6/1990 | Durbin et al. | |
| 4,960,981 A | 10/1990 | Benton et al. | |
| 4,977,595 A | * 12/1990 | Ohta et al. | ...................... 380/24 |
| 4,980,826 A | 12/1990 | Wagner | |
| 4,985,833 A | 1/1991 | Oncken | |
| 4,988,849 A | 1/1991 | Sasaki et al. | |
| 4,994,964 A | 2/1991 | Wolfberg et al. | |
| 5,030,806 A | 7/1991 | Collin | |
| 5,063,507 A | 11/1991 | Lindsey et al. | |
| 5,101,353 A | 3/1992 | Lupien et al. | |
| 5,179,698 A | 1/1993 | Bachman et al. | |
| 5,189,700 A | 2/1993 | Blandford | |
| 5,220,501 A | 6/1993 | Lawlor et al. | |
| 5,258,908 A | 11/1993 | Hartheimer et al. | |
| 5,420,405 A | * 5/1995 | Chasek | ........................ 235/379 |

(Continued)

OTHER PUBLICATIONS

The Bureau of Engraving and Printing J. Silvalia et al.*
Soviet Money of the Early 1920s ww_w.mit.edu.*
Image of Five Silver Dollar certificate.*

(Continued)

*Primary Examiner*—Hani Kazimi

(57) ABSTRACT

A system and method to allow gold to circulate as digital cash through the global computer network (Internet) and/or private communication networks much like cash currently circulates in the physical world. A computer system (emint) will create digital representations of gold (ecoins). Each ecoin will represent a weight of gold held at a participating secure storage facility (storage site), and each ecoin is given by the emint a unique Digital Hallmark™ by which it can be distinguished and identified. The sum total of all circulating ecoins (denominated in physical measures such as weights such as grams and/or ounces and fractions thereof) will equal the weight of all the gold held for safekeeping at the storage site(s) for the users of the emint. The ownership of gold is not transferred by a computer system executing debits and credits between individual accounts, but instead by individuals directly transferring ecoins amongst themselves (as is done in cash transactions, i.e., without double-entry bookkeeping).

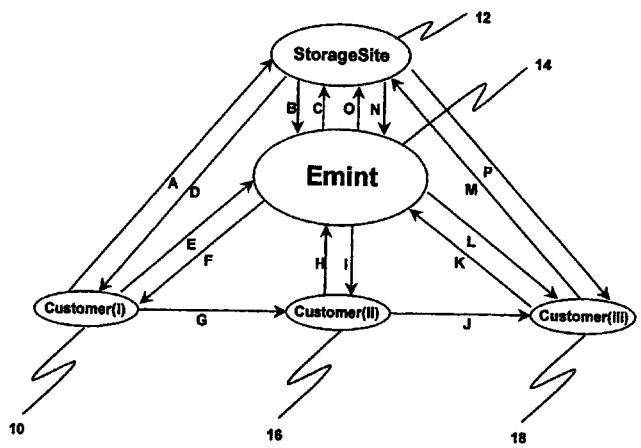

U.S. PATENT DOCUMENTS

| | | | |
|---|---|---|---|
| 5,438,509 A | | 8/1995 | Heffron |
| 5,453,601 A | * | 9/1995 | Rosen .......................... 705/65 |
| 5,477,038 A | * | 12/1995 | Levine et al. ................ 235/380 |
| 5,539,825 A | * | 7/1996 | Akiyama et al. .............. 705/68 |
| 5,548,110 A | * | 8/1996 | Storch et al. ................. 235/472 |
| 5,623,547 A | | 4/1997 | Jones et al. |
| 5,832,089 A | * | 11/1998 | Kravitz et al. ................. 380/24 |
| 5,898,154 A | | 4/1999 | Rosen |
| 6,119,946 A | * | 9/2000 | Teicher ....................... 235/492 |
| 6,122,625 A | | 9/2000 | Rosen |
| 6,188,993 B1 | | 2/2001 | Eng et al. |

OTHER PUBLICATIONS

Roberds; "The rise of electronic payments networks and the future role of the Fed with regard to payment finality"; Economic Review; Dialog File 15, Accession No. 00739433; Mar. 1993.

Juncker et al; "A primer on the settlement of payments in the United States"; Federal Reserve bulletin; col. 77, No. 11, Nov. 1991.

Muhammad; "Electronic commerce and the future of money", Black Enterprise v27n11, pp. 255–261; Dialog File 15, Accession No. 01427279, Jun. 1997.

Giles; "Electronic commerce", Network VAR, v5, n5, p. 26(7); Dialog File 15, Accession No. 02069436, May 1997.

Chaum; "Achieving Electronic Privacy", Scientific American; pp. 96–101, Aug. 1992.

Hayek; "Choice in Currency—A way to stop inflation", 1976 The Institute of Economic Affairs, with commentary.

Various authors; NEC ResearchIndex results showing excerpts of articles citing Medvinsky; "NetCash: A design for practical electronic currency on the Internet", Proceedings of the First ACM Conference on Computer and Communications Security, 1993.

Various authors; NEC ResearchIndex results showing excerpts of articles citing Chaum; "Achieving Electronic Privacy", Scientific American; pp. 96–101, Aug. 1992.

Gayle; "Offline digital cash unsuitable to current legal environment", http://www.interesting–people.org/archives/interesting–people/199307/msg00009.html, Jul. 3, 1993.

Newsgroup Posting; From: Howard Gayle, Subject: Why digital gold?, Newsgroup: talk.politics.crypto, Date: Dec. 4, 1993.

Newsgroup Posting; From: Timothy C. May, Subject: Scenario to Ban Cash Transactions?, Newsgroups: sci.crypt, alt.privacy, comp.org.eff.talk, Date: Nov. 25, 1992.

Newsgroup Posting; From: David A. Smith, Subject: Re: Netopia, Newsgroups: alt.cyberpunk, Date: Sep. 2, 1993.

Newsgroup Postings—messages 21–30 from thread; From: various authors, Subject: Re: Netopia, Newsgroups: alt.cyberpunk, Date: Aug. 30, 1993–Sep. 7, 1993.

Hahn; "Truly Anonymous Digital Cash Can Never Work", http://www.lclark.edu/~loren/cyberlaw97/hahn1.html, undated.

Hardy; "The Digital Silk Road", http://www.virtualschool.edu/mon/Bionomics/Extropians/HardyTribbleSilkRoad.html, undated.

Dougherty; "Making Sense Out of Digital Currency", http://www.china.si.umich.edu/econ495/writings/paper/Dougherty.html, undated.

List of Articles (authored by C. Chaum), http://www.chum.com/articleslist_of_articles.htm, undated.

Winn; "Clash of the Titans: Regulating the Competition Between Established and Emerging Electronic Payment Systems", Berkeley Technology Law Journal, undated.

Planetgold Patent Wars Page—Latest News Nov. 15, 2001, http://planetgold.com/Interview.asp?SPID=32967996, Nov. 15, 2001.

Rahn, et al.; "Research Study 24—Digital Money & Its Impact on Gold: Technical, legal and economic issues", Centre for Public Policy Studies, Nov. 2000.

Davies; "Electronic Money, or E–Money, and Digital Cash", http://www.ex.ac.uk/~Rdavies/arian/emoney.html, Apr. 30, 2002.

MacKie–Mason; "Readings (Preliminary)", http://www–personal.umich.edu/~jmm/courses/si760/readings.html, Nov. 8, 1998.

Turk; "Money and Currency in the $21^{st}$ Century", http://www.goldmoney.com/futuremoney.html, Jul. 1997.

Rahn, et al.; "Digital Money & It's Impact on Gold: Concerns & Issues", http://www.goldbankone.com/article.php?op=Print&sid=105, Jul. 12, 2001.

Konig; "The Evolution of Money—From Commodity Money to E–Money", UNICERT IV Program, Jul. 6, 2001.

New World Intelligence report of unknown title, 2002.

Unknown author; "The e–money mandate", Http://www.finextra.com/fullfeature.asp?id=256, May 24, 2002.

Unknown author; "Digital or Just Gold?", http://www.goldecomony.com/article.php?sid=187, May 22, 2002.

North; "Gold Standards: The Good, The Bad, and The Ugly", http://www.lewrockwell.com/north108.html, Jun. 21, 2002.

Committee on Payment and Settlement Systems et al., "Security of Electronic Money", Bank for International Settlements, 1996.

May; "Digital Cash and Net Commerce",http://ftp.easynet.nl/mirror/munitions/documents/cyphernomicon/chapter12/12.1.html, Sep. 10, 1994.

Jackson; "Douglas Jackson's personal analysis and opinion regarding patent # 5,671,364: 'Method and system for commodity–based currency for payment of accounts and elimination of payment risk', Inventor: James Turk", undated.

Griffith; "GoldMoney—Title or Claim?", http://www.goldecomony.com/ARTICLE.PHP?SID=169, Feb. 5, 2002.

Email; From: Ken Griffith; Sent: Tuesday, Jul. 31, 2001 3:00 PM; To: Douglas Jackson; Subject: A Challenge to the GoldMoney Patent.

Email; Subject: [e–gold–list] inventions requiring a response; Date: Mon, Nov. 5, 2001 18:42:23–0500; From: Douglas Jackson; To: "e–gold Discussion".

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

* * * * *